United States Patent
Guzzoni

(10) Patent No.: US 6,179,349 B1
(45) Date of Patent: Jan. 30, 2001

(54) MODULAR PIPELINE CONNECTOR

(75) Inventor: Paolo Guzzoni, Puegnago Del Garda (IT)

(73) Assignee: Teseo S.R.L. (IT)

(*) Notice: Under 35 U.S.C. 154(b), the term of this patent shall be extended for 0 days.

(21) Appl. No.: 09/189,907

(22) Filed: Nov. 12, 1998

(30) Foreign Application Priority Data

Nov. 26, 1997 (IT) .......................................... BS970095 U

(51) Int. Cl.[7] .................................................. F16L 17/00
(52) U.S. Cl. ........................ 285/370; 285/420; 285/191; 285/125.1
(58) Field of Search ..................... 289/370; 285/124.1, 285/125.1, 133.21, 139.2, 139.3, 141.1, 906; 403/381, 231, 174

(56) References Cited

U.S. PATENT DOCUMENTS

| | | | |
|---|---|---|---|
| 5,116,161 | * | 5/1992 | Faisst .................................... 403/231 |
| 5,494,370 | * | 2/1996 | Habicht et al. ...................... 403/231 |
| 5,769,460 | * | 6/1998 | Imai ..................................... 285/420 |
| 5,785,359 | * | 7/1998 | Nagai et al. ......................... 285/191 |
| 5,806,897 | * | 9/1998 | Nagai et al. ....................... 285/125.1 |
| 5,938,245 | * | 8/1999 | Guzzoni ............................... 285/420 |

FOREIGN PATENT DOCUMENTS

2246609 * 5/1992 (GB) ...................................... 248/29

* cited by examiner

Primary Examiner—Lynne H. Browne
Assistant Examiner—Aaron Dunwoody
(74) Attorney, Agent, or Firm—McGlew and Tuttle, P.C.

(57) ABSTRACT

A system of elements for the formation of pipelines in units for channeling and distributing a gaseous or liquid fluid that is under pressure or under vacuum. The pipelines are created starting from an extruded section pipe with a four-sided cross section having at least one central longitudinal hole and gripping elements along the corners of its walls. A joint which can be inserted tightly into the hole of consecutive section pipes makes possible their connection with the transmission of fluid. A fixing clamp is mounted on the adjacent ends of the consecutive pipes and engages with the gripping elements to mechanically lock the pipes among one another.

16 Claims, 4 Drawing Sheets

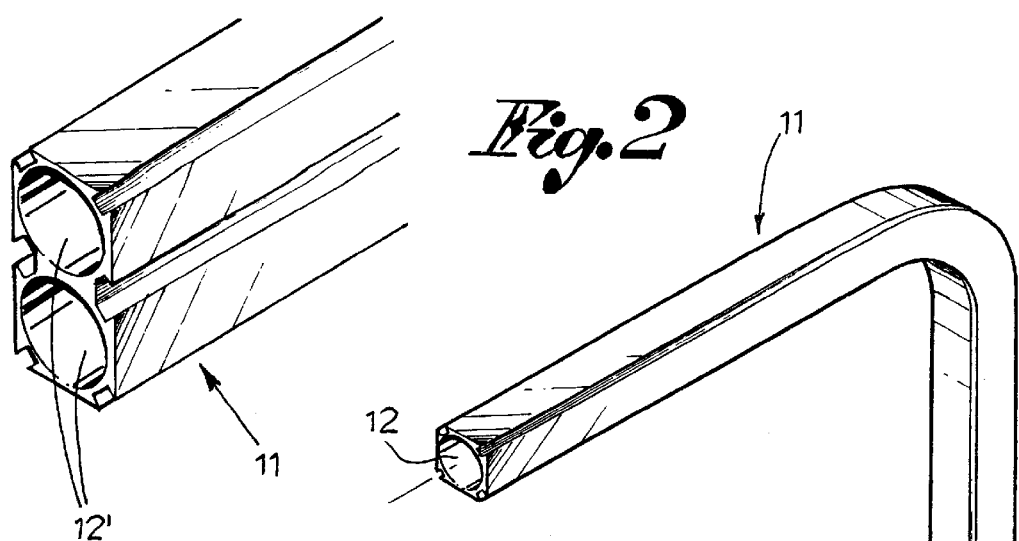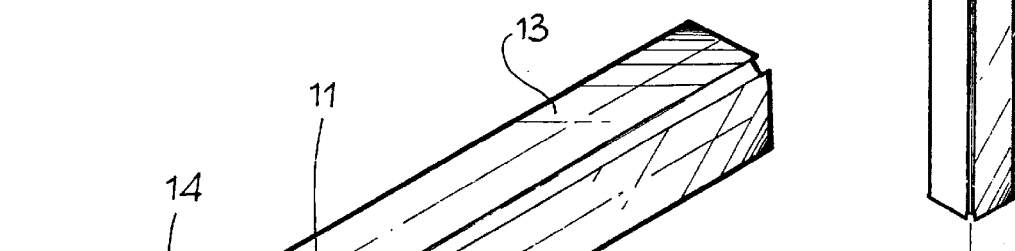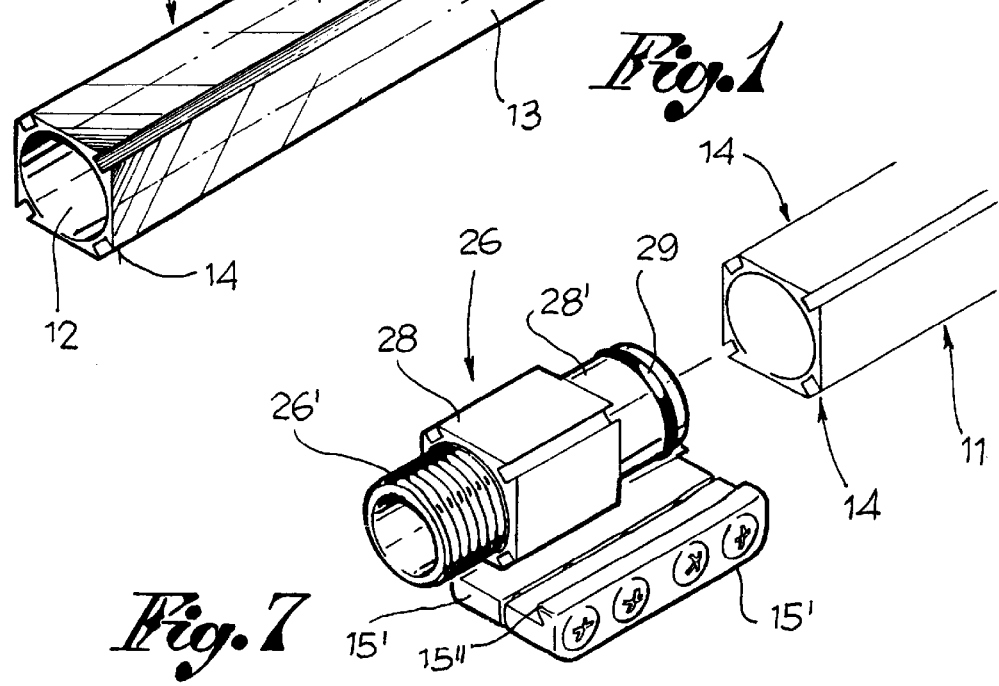

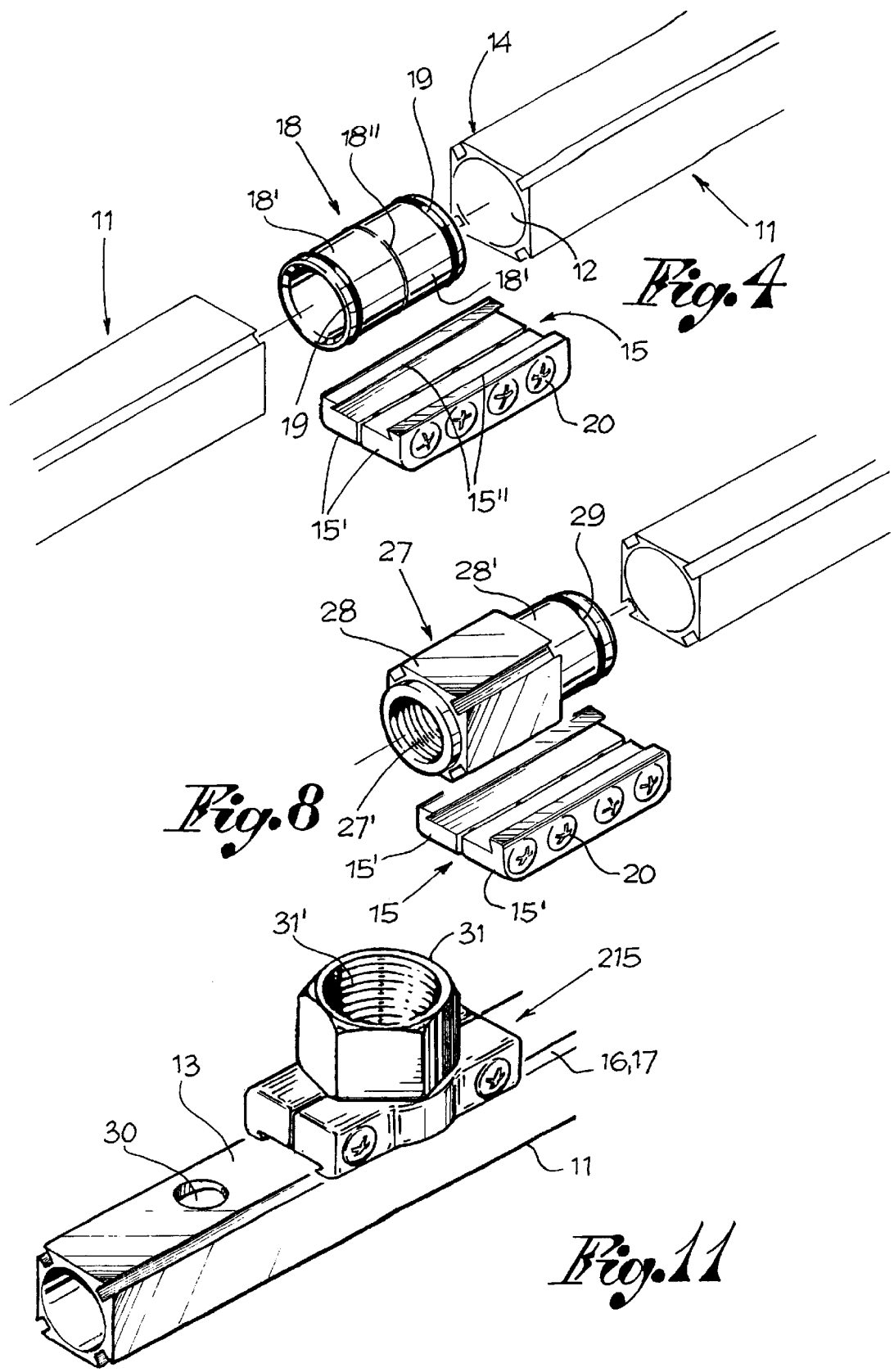

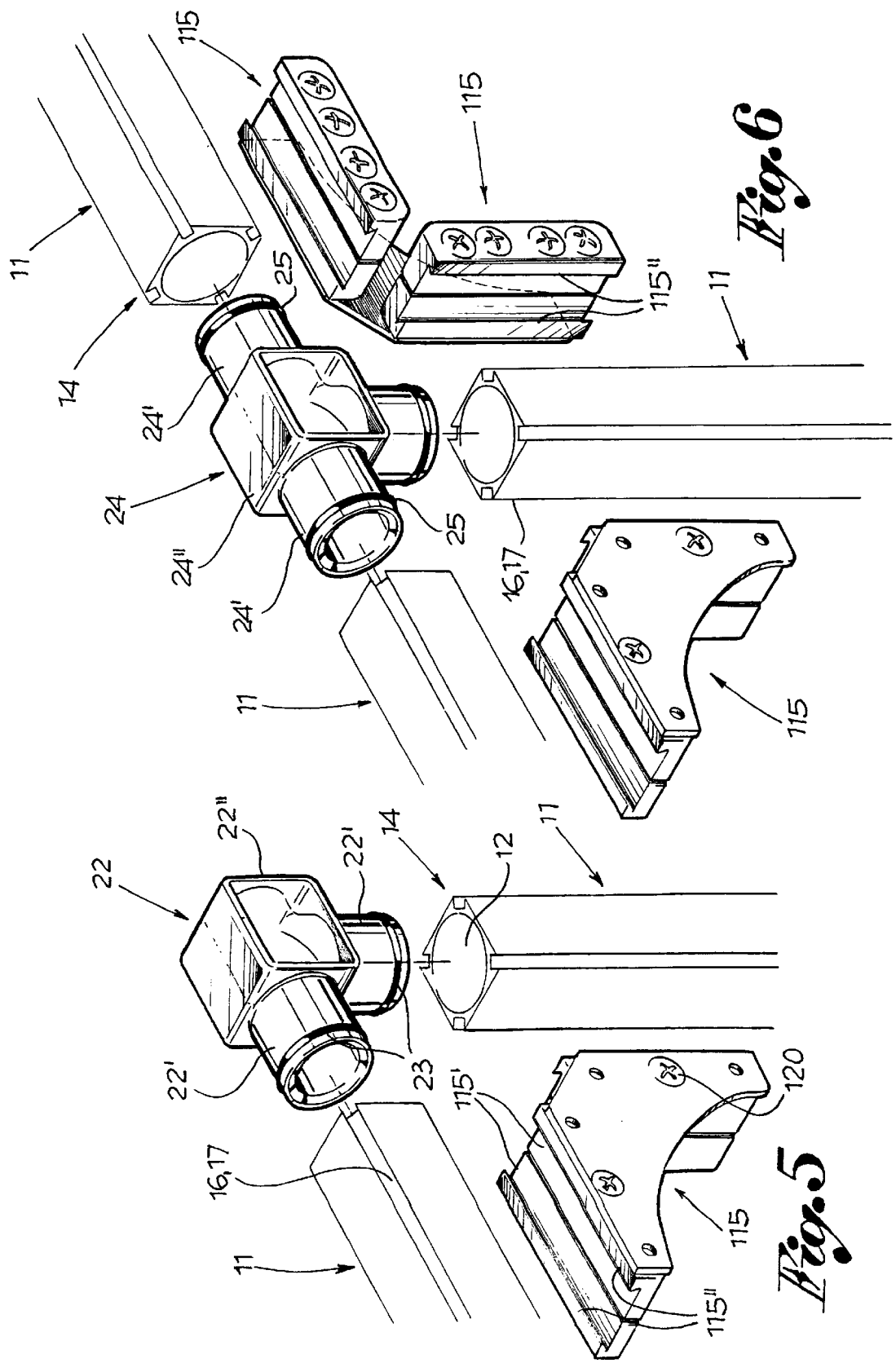

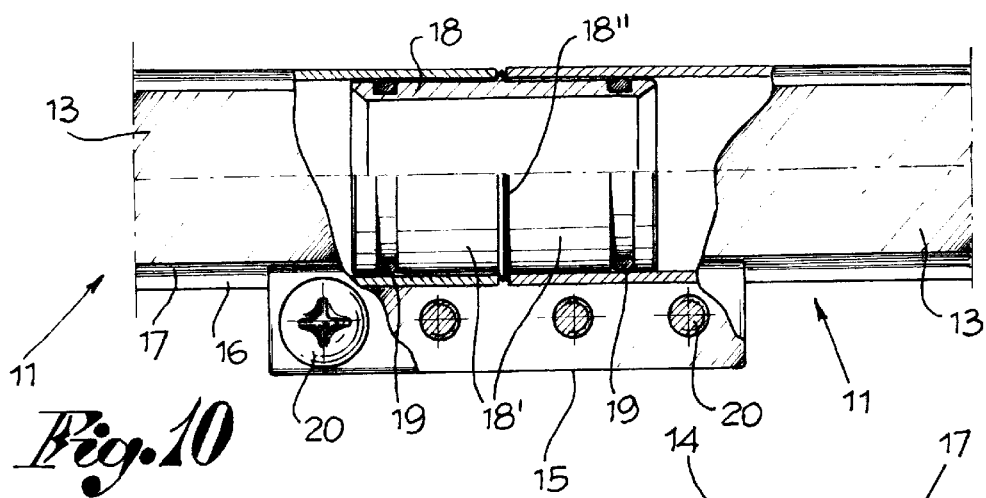
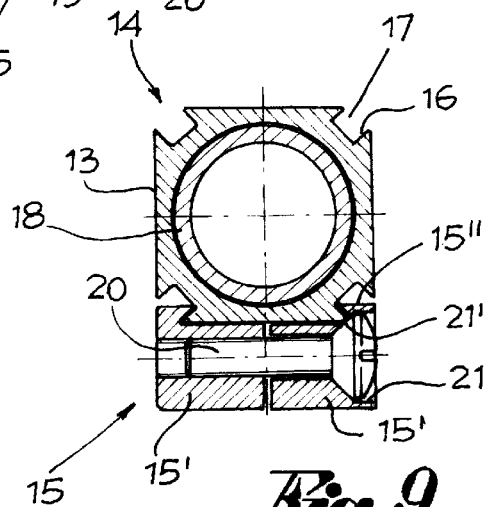
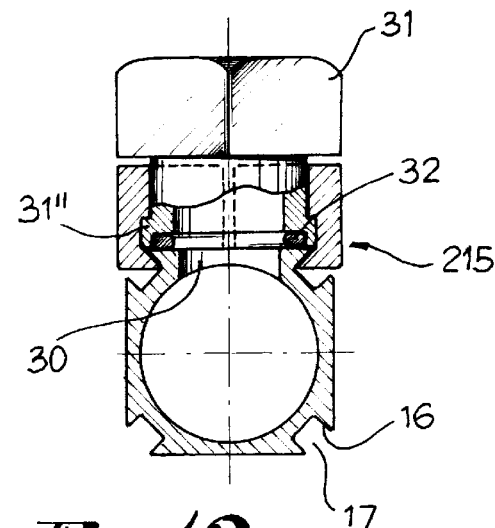
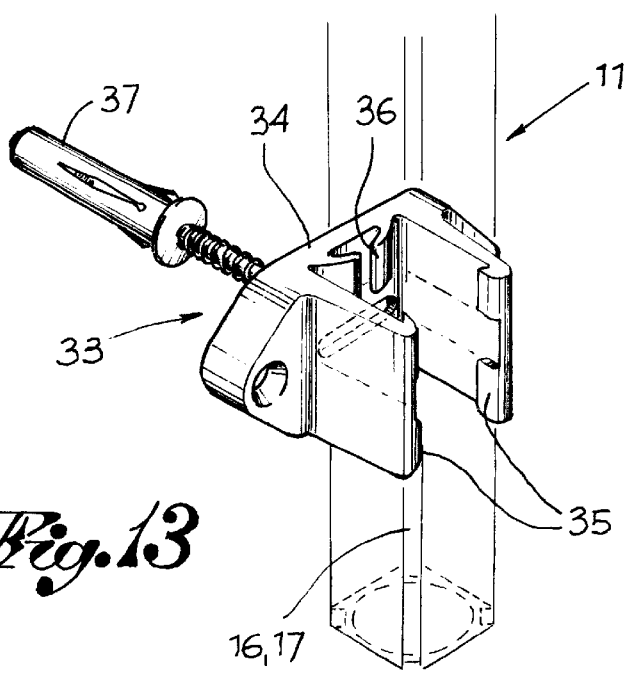

MODULAR PIPELINE CONNECTOR

FIELD OF THE INVENTION

The present invention pertains in general to the units for channeling and distributing fluids which are either gaseous or liquid, under pressure or under vacuum, and it pertains more specifically to a system of elements for a modular connection, in line or at an angle, of pipelines which consist of extruded pipe sections for such units.

BACKGROUND OF THE INVENTION

The use of extruded hollow bars made of aluminum or the alloys thereof as pipelines in the units for channeling and distributing gaseous or liquid fluids, such as air, gas, oils, water, etc. has already been proposed. These bars have usually at least one longitudinal hole and grooves along the sides of the perimeter defined by longitudinal beads or fins obtained from the extrusion. The bars thus shaped can be connected, in line or at an angle, with other identical hollow bars with the aid of round tubular joints, which are inserted in a fluid-tight manner into the hole of the adjacent bars and with connecting plates which are joined and are locked by means of screws in the outer grooves of the bars to be connected.

However, such a method for constructing pipelines for fluids is complex, labor-intensive, burdensome and not without disadvantages. This method involves the use of extruded hollow bars that have a relatively large and elaborate cross section given the presence of the fins or the faces which must delimit the outer grooves for anchoring the connecting plates. Thus, the bars will be relatively bulky and heavy, and given their profile, are difficult, if not impossible, to bend, where necessary, without modifying the profile of the section in the bent part. In addition, the connecting plates are also complex and require counter-plates for the locking in the outer grooves of the section.

SUMMARY AND OBJECTS OF THE INVENTION

The main object of the present invention is to propose a novel system for the modular joining of pipelines consisting of extruded pipe sections, which system is simpler, easier, faster and more economical to carry out and yet does ensure the maximum efficiency and reliability of the resulting unit.

Another object is to propose a system for forming units for the channeling and distribution of fluids with the use of extruded section pipes, which have a simpler cross section, are less bulky and are lighter with the same central hole and fluid output as the prior-art bars and with the aid of locking means, which are simpler and more efficient.

These objects are accomplished with a pipe connection system which in its basic form includes first and second pipe sections having longitudinal passages and outer walls. A joint is insertable into the longitudinal passages of the first and second pipe sections. A clamp means engages with a gripping means on the outer walls of the pipes for clamping the first and second pipe sections together, and mechanically locking the first and second pipe sections together with the clamp means.

The gripping means of the pipe sections includes a plurality of longitudinal gripping shoulders, each gripping shoulder forming an acute angle with one of the flat outer walls to which the gripping shoulder is joined. The clamp means includes two blocks arranged side by side and connected transversely by locking screws.

Each of the blocks have a dovetail face and have a sloped internal surface similar to the gripping shoulder. The dovetail faces engage with the gripping shoulders when the blocks are pressed together by the locking screws.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a sectional view of a pipe section for pipelines having a single longitudinal hole and outer angular groove for the connection;

FIG. 2 is a sectional view of a pipe section for pipelines having two longitudinal holes;

FIG. 3 is an example of a pipe section similar to the pipe section in FIG. 1, with a bend;

FIG. 4 is a perspective view of a straight joint and of a connecting clamp, which are separate and in relation to two portions of pipe to be connected in line;

FIG. 5 is a perspective view of an elbow joint and of an angular connecting clamp in relation to two portions of pipe to be connected at an angle;

FIG. 6 is perspective view of means for a T connection of three sections of section pipe;

FIGS. 7 and 8 are a view of a male threaded terminal and a female threaded terminal, respectively, which can be applied to a pipe section pipe by means of a clamp;

FIG. 9 is a cross sectional view of the locking of a clamp to a pipe section;

FIG. 10 is the longitudinal sectional view of the connection in FIG. 9;

FIG. 11 is a perspective view of a lateral fluid intake applied to a pipe section;

FIG. 12 is a cross sectional view of the assembly in FIG. 11; and

FIG. 13 is a view of the application of a bracket to a pipe section for hanging or fixing the pipe section to a wall.

DESCRIPTION OF THE PREFERRED EMBODIMENT

In the drawings, an extruded pipe or pipe section made of aluminum or made of another extrudable material, which can be used as a pipeline in the formation of units for channeling and distributing any gaseous or liquid fluid, is designated by 11. The pipe 11 may have a single longitudinal hole 12 with a smooth surface (FIG. 1) or two or more longitudinal holes 12', also having a smooth surface and, if necessary, the pipe 11 may be bent (FIG. 3).

For the sake of simplicity, the description below concerning the joining of pipes for the formation of pipelines refers to a pipe section 11 with a single hole 12, but it also applies to pipe with two holes.

The pipe 11 may have a preferably, but not exclusively four-sided, and especially square, cross section, with flat outer walls 13, longitudinally, in relation to the corners of the walls 13. The pipe 11 has gripping means 14 for engaging with at least one fixing clamp 15 for mechanically joining the section pipes in line, at an angle, in the shape of a T, or for fixing accessory elements as explained above.

In the example shown, the gripping means 14 are in the form of longitudinal shoulders formed by flanks of channel-like grooves 17, made from extrusion along the pipe 11 and open outward.

Looking at a top or sectional view of the pipe, each shoulder 16 has a surface which is at least partly angled with respect to the flat lateral wall 13 to which it is joined, forming an acute angle with the respective flat lateral wall 13. In practice, on opposite sides of each outer wall 13 of the section pipe 11, there are two shoulders 16 that are symmetrical and converge towards the inside of the pipe.

However, it should be noted that although the angled configuration of the shoulders remains stationary, these shoulders 16 may be made in another way and may be provided only on some walls of the pipe 11, without going beyond the scope of the present invention.

In each case, the pipe 11 has advantages: lightness, thanks to the materials with which it is produced from extrusion; low cost because of its low weight and structural simplicity; maximum strength which is ensured by the outer shoulders which also act as beads; a high output without loss of flow, thanks to the smooth surface of the hole; easy bending with pipe-bending tools.

The pipe 11 may be preset or cut to any length and then be connected to other identical pipes or to other components.

Two pipes 11 may be connected in line by placing a straight joint 18 between the two pipes 11 and by means of a fixing clamp 15 that is likewise straight (FIG. 4).

The straight joint 18 has two opposite cylindrical branches 18', which are separated by a central raised collar 18". Each branch 18' has at least one seal 19 on its periphery, and is dimensioned so as to be inserted with precision into the holes 12' of the two pipes 11 to be connected.

The clamp 15 comprises two blocks 15', which are arranged side by side and are connected transversely by two or more locking screws 20. Each of the blocks 15' has a dovetail face 15" with a sloped internal surface (when viewed in cross section) similarly to the gripping shoulder 16 on the sides of each section pipe 11. The faces 15" of the blocks are essentially dimensioned for passing in two parallel grooves 17 of the section pipes to engage with two respective shoulders 16 when the clamp 15 is pressed by means of the locking screws 20 (FIG. 9). As shown in FIG. 10, the clamp is arranged and mounted on the adjacent ends of the section pipes to be connected after the joint 18 has been inserted there.

It should also be noted that the heads of the locking screws 20 are fitted in the corresponding holes 21 provided in a block 15' of the clamp 15, and that, to improve the locking of the assembled parts both in the longitudinal direction and the transverse direction, an opening 21' is provided on the bottom of each of the holes. Through this opening the head of the screw (FIG. 9) will be fitted and will bear upon the corner of the shoulder of the pipe 11, directly or through a tooth inside one block 15'.

The pipes 11 may also be arranged and be connected at an angle by placing an elbow joint 22 between them (FIG. 5). This elbow joint 22 has two angled cylindrical branches 22', which extend from an intermediate body 22", each of which has a seal 23, and which are threaded or inserted in the adjacent end of the two pipes to be connected. The two pipes 11 are fixed at an angle in this case with a square clamp 115. This square clamp 115 also comprises two blocks 115', which are arranged side by side and are connected by cross screws 120 and each block has a dovetail face 115", which is intended for being inserted into the grooves 17 of the pipes 11 for engaging tightly with the shoulders 16, in the same manner as for the linear connection of the pipes 11 described above.

The pipes 11 may also be arranged and be connected in the shape of a T or a cross. In the T-arrangement example shown in FIG. 6, the connection is carried out by placing between the pipes a three-path joint 24, having three cylindrical branches 24', which extend from three sides of an intermediate body 24", each of which has a seal 25, and which are threaded in the adjacent ends of the three pipes 11 to be connected. The fixing of the pipes is then carried out by means of two square clamps 115, which are completely similar to and used in the same manner as the square clamp 115 for connecting two pipes 11 at an angle described above.

A pipe 11 may also be provided, if necessary, with a terminal cap or pipe fitting that is blind, has a male thread, has a female thread, or etc. A terminal pipe fitting 26 having a male thread 26' and a terminal pipe fitting 27 having a female thread are shown in FIGS. 7 and 8, respectively. Each of the pipe fittings 26 and 27 has a main body 28 having the same profile, i.e., having the same gripping shoulders 16, as the section pipe, and besides the respective threaded part 26' or 27', it has a cylindrical branch 28' with a seal 29 that is intended for being inserted into the end of the pipe 11. The terminal pipe fitting 26 or 27 is fixed to the section pipe by means of the straight clamp 15 described above, which is arranged so as to engage with the pipe 11 and with the main body 28 of the pipe fitting 26 or 27 simultaneously.

The advantages of the joining of the section pipes to one another and/or of the end pipe fittings to pipes with the use of joints and of clamps mentioned above may be characterized by the simplicity and the low cost of the components, by the great strength and reliability of the locking, by the hermetic sealing of the fluid under pressure and by the ease of assembly.

Furthermore, the pipe 11 may be provided with one or more lateral outlets for the intake of fluid (FIGS. 11 and 12). Therefore, on any side and zone of the pipe is a hole 30 can be provided, corresponding to which a bush is fixed. This bush has a threaded hole 31' and, at its base, a seal 32. This seal is intended for resting on the outer surface of the pipe around the outlet hole 30.

Around its base, the bush 31 has a collar 31" that is used for fixing the bush to the pipe 11. The fixing is achieved with a clamp 215 that is similar to the linear clamp 15 for connecting two pipes, but where the blocks that comprise it are shaped on the inside for enclosing and engaging with the collar 31", and for locking the bush on the pipe when the clamp is tightened. The fluid intake outlet is therefore easy to embody at any point of the pipeline with the special advantage of the interchangeability of the bush 31.

The gripping means 14, or the shoulders 16, of the pipe 11, are also used for connecting a self-locking hanging support 33 to the pipe (FIG. 13). This support 33 comprises a fork-shaped body 34 made of plastic material that is provided with terminal hooking teeth 35 and with a bottom elastic part 36 for the self-locking. The hooking teeth 35 are made to engage with the shoulders 16 on one side of the pipe 11, while the bottom elastic part 36 resting against the opposite side of the pipe ensures the tight joining. The support may be fixed before-hand by means of an expandable cap 37, for example, and makes possible an easy hanging of the pipe with the possibility of making it slide for positioning and of keeping it isolated from the wall to which it is attached.

The features described in specification, drawings, abstract, and claims, can be used individually and in arbitrary combinations for practicing the present invention.

While specific embodiments of the invention have been shown and described in detail to illustrate the application of the principles of the invention, it will be understood that the invention may be embodied otherwise without departing from such principles.

What is claimed is:

1. A pipe connection system comprising:
a first pipe section having a longitudinal passage and an outer wall;
a second pipe section having a longitudinal passage and an outer wall;
a joint insertable into said longitudinal passages of said first and second pipe sections;
clamp means for clamping said first and second pipe sections together;
gripping means on said outer wall of said first and second pipe sections for engaging with said clamp means and mechanically locking said first and second pipe sections together with said clamp means, said clamp means includes two blocks arranged side by side and connected transversely by locking screws, each of said blocks having a dovetail face and having a sloped internal surface engaging with said gripping means when said blocks are pressed together by said locking screws.

2. A system in accordance with claim 1, wherein:
said gripping means of said pipe sections include a plurality of longitudinal gripping shoulders, each said gripping shoulder forming an acute angle with one of said flat outer walls to which said gripping shoulder is joined.

3. A system in accordance with claim 1, wherein:
said joint is one of linear shaped, elbowed shaped, T-shaped, and cross shaped.

4. A system in accordance with claim 1, wherein:
said joint has a plurality of branches for inserting into a plurality of said pipe sections.

5. A system in accordance with claim 1, wherein:
said clamp means is one of linear and right angle shaped for fixing said pipe sections at one of in line and at right angles.

6. A system in accordance with claim 3, wherein:
said dovetail face has a sloped internal surface similar to said gripping shoulder.

7. A system in accordance with claim 6, wherein:
said locking screws have a head, said clamping means positions said heads of said locking screws to engage with said gripping shoulder of said gripping means.

8. A system in accordance with claim 1, further comprising:
a terminal pipe fitting being one of a blind fitting, a male thread, and a female thread, and said pipe fitting having a cylindrical branch with a seal intended for fitting into said passage of one of said pipe sections, said pipe fitting including a profiled body with gripping means identical to those of said pipe sections, said pipe fitting being fixed to said one pipe section by another said clamp means which simultaneously engages with said gripping means of said one pipe section and said gripping means of said pipe fitting.

9. A system in accordance with claim 1, further comprises:
an outlet formed by a hole in said outer wall of one of said pipe sections and a threaded bush fixed on said outer wall of said one pipe section in line with said hole, said bush having a basic seal resting on said outer wall surrounding said hole and said bush being locked on said one pipe by another clamp means, said another clamp means including two parts connected by transverse locking screws, said another clamp means engaging with said gripping means of said one pipe section and tightly enclosing a collar provided around said bush.

10. A system in accordance with claim 1, further comprising:
a support made of plastic material for hanging one of said pipe sections, said support having a shape of a fork and having hooking ends bound to said gripping means of said one section pipe, said support including a bottom elastic portion resting against a wall of said one pipe section for a self-locking of said support to said one pipe section.

11. A system in accordance with claim 1, wherein:
said first and second pipe sections have a four-sided cross section with a plurality of said outer walls;
said longitudinal passages of said first and second pipe sections are a central longitudinal hole;
said outer walls are flat;
said gripping means are positioned along corners of said outer walls;
said joint transmits fluid;
said clamp means is mounted on adjacent ends of said first and second pipe sections.

12. A pipe connection system comprising:
a first pipe section having a longitudinal passage and an outer wall;
a second pipe section having a longitudinal passage and an outer wall;
a joint insertable into said longitudinal passages of said first and second pipe sections;
clamp means for clamping said first and second pipe sections together;
gripping means on said outer wall of said first and second pipe sections for engaging with said clamp means and mechanically locking said first and second pipe sections together with said clamp means, said gripping means including a plurality of longitudinal gripping shoulders, each said gripping shoulder forming an acute angle with one of said flat outer walls to which said gripping shoulder is joined.

13. A system in accordance with claim 12, wherein:
said gripping shoulders include flanks of channel-like grooves, said grooves run along corners of said pipe sections.

14. A system in accordance with claim 13, wherein:
said shoulders are positioned along two opposite said outer walls.

15. A pipe connection system comprising:
a first pipe section having a longitudinal passage and an outer wall;
a second pipe section having a longitudinal passage and an outer wall;
a joint insertable into said longitudinal passages of said first and second pipe sections;
clamp means for clamping said first and second pipe sections together;
gripping means on said outer wall of said first and second pipe sections for engaging with said clamp means and mechanically locking said first and second pipe sections together with said clamp means;

an outlet formed by a hole in said outer wall of one of said pipe sections and a threaded bush fixed on said outer wall of said one pipe section in line with said hole, said bush having a basic seal resting on said outer wall surrounding said hole and said bush being locked on said one pipe by another clamp means, said another clamp means including two parts connected by transverse locking screws, said another clamp means engaging with said gripping means of said one pipe section and tightly enclosing a collar provided around said bush.

16. A pipe connection system comprising:

a first pipe section having a longitudinal passage and an outer wall;

a second pipe section having a longitudinal passage and an outer wall;

a joint insertable into said longitudinal passages of said first and second pipe sections;

clamp means for clamping said first and second pipe sections together;

gripping means on said outer wall of said first and second pipe sections for engaging with said clamp means and mechanically locking said first and second pipe sections together with said clamp means;

a support made of plastic material for hanging one of said pipe sections, said support having a shape of a fork and having hooking ends bound to said gripping means of said one section pipe, said support including a bottom elastic portion resting against a wall of said one pipe section for a self-locking of said support to said one pipe section.

* * * * *